Figure 1:
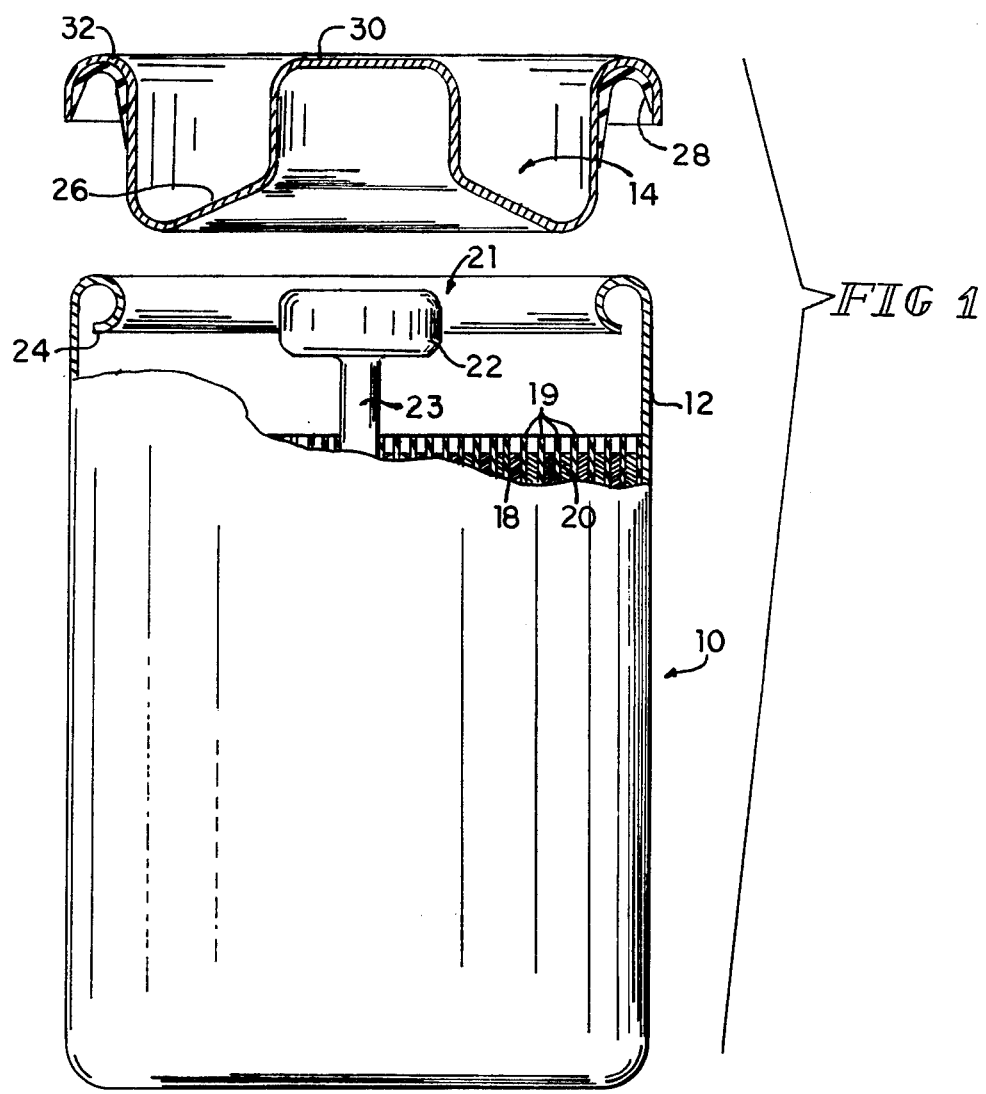

United States Patent [19]

Mallory

[11] 4,136,438
[45] Jan. 30, 1979

[54] ELECTRICAL DEVICE

[75] Inventor: Henry R. Mallory, Greenwich, Conn.

[73] Assignee: P. R. Mallory & Co. Inc., Indianapolis, Ind.

[21] Appl. No.: 813,024

[22] Filed: Jul. 5, 1977

Related U.S. Application Data

[62] Division of Ser. No. 728,672, Oct. 1, 1976, Pat. No. 4,052,537.

[51] Int. Cl.² .................... H01M 2/04; H01M 2/36
[52] U.S. Cl. .................................. 29/623.2; 29/731; 141/5; 141/7
[58] Field of Search ............... 29/623.2, 623.1, 731, 29/730; 141/66, 4, 5, 7, 3, 20; 429/164–174, 185, 94

[56] References Cited

U.S. PATENT DOCUMENTS

| 2,026,615 | 1/1936 | Corigliano et al. | 429/172 |
| 2,243,676 | 5/1941 | Koppelman | 429/172 |
| 2,763,415 | 9/1956 | Bagarozy | 141/20 |
| 2,768,490 | 10/1956 | Dawson et al. | 141/66 |
| 2,780,899 | 2/1957 | Benson et al. | 141/3 |
| 2,947,126 | 8/1960 | Focht | 141/20 |
| 3,212,537 | 10/1965 | Hinxlage et al. | 141/7 |
| 3,477,195 | 11/1969 | Chambers | 141/3 |
| 3,485,673 | 12/1969 | Jost | 429/185 |
| 3,694,267 | 9/1972 | Angelovich | 429/172 |
| 3,764,392 | 10/1973 | Kuwazaki et al. | 429/165 |
| 3,826,687 | 7/1974 | Dey | 429/174 |
| 3,995,666 | 12/1976 | Michaels | 141/20 |

FOREIGN PATENT DOCUMENTS 1002464  8/1965  United Kingdom ................. 141/3

*Primary Examiner*—C. W. Lanham
*Assistant Examiner*—Daniel C. Crane
*Attorney, Agent, or Firm*—Ronald S. Cornell; Israel Nissenbaum; Charles W. Hoffmann

[57] ABSTRACT

An enclosure for an electrochemical device, especially useful for electrochemical cells having an internal pressure above ambient, wherein the enclosure is formed in accordance with techniques based upon aerosol container filling procedures.

8 Claims, 2 Drawing Figures

U.S. Patent

Jan. 30, 1979

4,136,438

ELECTRICAL DEVICE

This application is a division of application Ser. No. 728,672, filed Oct. 1, 1976, now U.S. Pat. No. 4,052,537.

The present invention relates to electrical devices and to means and methods for enclosing or containing electrical devices. More particularly, the invention relates primarily to enclosures or housings for electrochemical cells, wherein said enclosure is formed similarly to containers of the type used for aerosol sprays. The invention is particularly useful with electrochemical cells of the lithium/sulfur dioxide type which develop an internal pressure in excess of ambient pressures.

Electrochemical cells generally include two dissimilar electrodes in a reactive medium enclosed within a housing, the housing comprising two or more electrically conductive component parts electrically connected to the electrodes but electrically isolated from each other, and the housing providing external electrical termination for the cell. A common construction for the housing for an electrochemical cell is a hollow, cylindrical, electrically conductive container having an open end and a closure assembly adapted to seal the open end of the container. The closure assembly may comprise an electrically conductive, disc shaped closure member and an electrically insulating gasket about the periphery thereof to electrically isolate the member from the container. The closure assembly is generally held in close engagement with the container by an external edge of the container which is bent inwardly to physically retard outward movement of the closure assembly, whereby to hold the closure assembly securely against the effect of increased internal pressure.

In the operation of an electrochemical cell, the housing should be and remain sufficiently hermetic so as to minimize leakage of the reactive medium from the cell because leakage can cause damage to the cell itself or to apparatus to be energized by the cell. In addition, the housing should minimize the ingression of harmful contaminants from the ambient atmosphere which may cause deterioration of the electrical characteristics of the cell.

Cells having housings of the type described above, especially those of the lithium/$SO_2$ type have been difficult to fill and, when filled, often do not achieve the desired degree of hermeticity, especially when the cell is subjected to temperature cycling. The integrity of the seal between the container and the closure assembly has not been totally satisfactory and has even led to the use of welding techniques and to the use of expensive glass to metal seals in order to obtain hermeticity.

It is therefore a feature of the present invention to provide an electrical device having a housing which minimizes the leakage of materials from the interior of the device. Another feature is that the housing for an electrical device of the present invention is relatively easy to manufacture using available equipment. Yet another feature of the present invention is that the housing for an electrical device is able to withstand temperature cycling without a significant loss in hermeticity.

Figure 2:
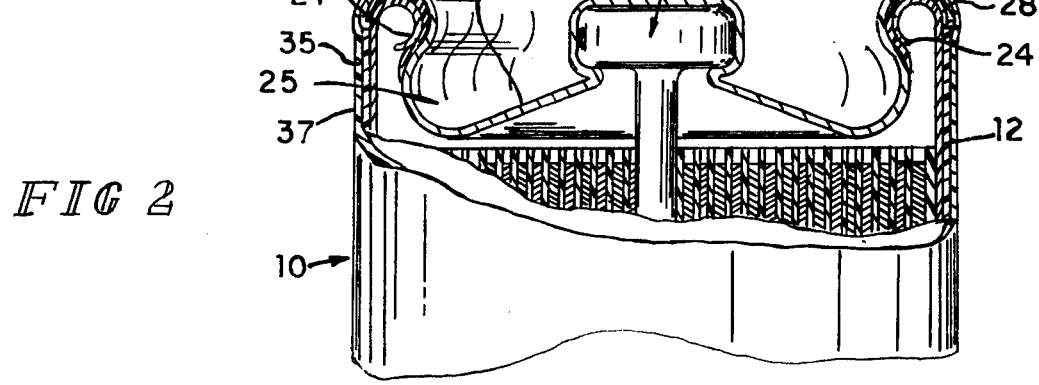

These and various other features of this invention as well as many specific advantages will be more fully apparent from a detailed consideration of the remainder of this disclosure including the appended claims in conjunction with the accompanying drawing in which:

FIG. 1 is a view of the component parts of an electrical device shown in partial cross-section prior to closure of the housing; and FIG. 2 is a partial cross-sectional view of the electrical device of FIG. 1 after closure.

Generally, the present invention relates to a means and method for providing an electrical device including a housing. The electrical device comprises an electrical body in a housing including an elongated cylindrical container or can body having a height substantially greater than its diameter and an open end defined by a rim, the rim of the container being rolled over, preferably inwardly of the wall of the container, and a closure assembly or cover over and closing the open end of the container. The closure assembly includes a member having its periphery generally complementary to the shape of the rolled over rim of the container. The closure assembly is sealed to the rolled over rim of the container by crimping the closure radially outwardly or inwardly (or both) to seal against said rolled over rim which provides counterpressure support for the crimping operation. In order to provide two terminals of opposite polarity when, in the preferred embodiment, the electrical device is an electrochemical cell, an electrically insulating layer is positioned between the closure and the rolled rim. In a preferred embodiment, the electrical body of the cell includes a lithium containing electrode and an $SO_2$ depolarizer and the container and member consist essentially of aluminum, although other materials such as steel, etc. can of course be used.

A preferred embodiment of the invention is shown in FIGS. 1 and 2. In FIG. 1, the electrical device shown is an electrochemical cell 10 comprising metallic container 12, closure assembly 14 and an electrical body 16 within the container. The electrical body 16 comprises convolutely wound anode and cathode electrodes 18 and 20 in an electrolyte (not shown). Positioned between adjacent turns of electrodes 18 and 20 are plastic separator strips 19 which are also convolutely wound. In electrical contact with the anode electrode 18 is anode current collector 21, the collector being shown in a nail type configuration with a head 22 and a shank 23. Electrical contact is made from the cathode electrode 20 to the container 12 by a suitable connector (not shown). The entire rim 24 of container 12 is rolled inwardly to the shape of a torus to provide support for attachment and sealing of closure assembly 14. Note that, in the embodiment shown, rolled over rim 24 of container 12 does not contact the side wall of the container.

Closure assembly 14 comprises electrically conductive member 26 and electrically insulating material 28. Member 26 includes hollow protuberance or cup 30 adapted to receive the end 22 of anode collector 21 and includes lip portion 32 in a configuration that conforms generally to the shape of the rolled over rim 24 of container 12. Electrically insulating material 28 is disposed over the underside of edge portion 32 so as to electrically isolate the member 26 from container 12 in the completed device.

FIG. 2 illustrates the completed closure of the electrochemical cell 10 of FIG. 1. The hollow protuberance or cup 30 has been brought into electrical contact with anode current collector head 22 and the insulating material 28 disposed on edge portion 32 is in engagement with rolled over rim 24 of the container 12. A suitable tool or tools (now shown) have crimped member 26 inwardly beneath the lower edge of the head portion 22 of anode collector 21 and radially outwardly beneath the rolled over rim 24 of container 12 to form annulus 25 which extends beneath torus 24. Member 26, excluding shaped edge portions 32, now has a diameter greater than the diameter of the inner portion of rolled over rim (torus) 24. Thus, closure assembly 14, including member 26, is effectively held in close engagement with container 12 and thereby provides a seal for the open end of the container.

Typically, the forming or crimping of member 26 about rolled over rim 24 is accomplished by crimping or forming the member 26 to container 12 by what is known as an "expanding collet" type crimping machine of a type which is well known in the aerosol container art. Similarly, member 26 is formed about anode collector head 22 by forming or crimping the protuberance or cup 30 about the anode collector head 22 by a "pedestal" crimping machine having a contracting collet. This machine forms the walls of protuberance or cup 30 under the nailhead portion of anode collector head 22 to help provide good electrical contact between the member 26 and the anode collector. These steps can be carried out simultaneously or in seriatim. To further insure good electrical contact, it may be desirable to weld the anode collector 22 to the member 26 by any suitable method such as by parallel electrode resistance welding.

As can be seen from FIG. 2, the crimping of member 26 into the configuration shown causes member 26 to have a larger diameter inside the container 12 than the diameter of the innermost periphery of torus 24. With such a construction, closure assembly 14 is not likely to disengage if internal pressures are generated by the electrical body 16. In addition, because rim 24 is not completely rolled over to engage the wall of container 12, excess crimping forces on member 26 can be tolerated due to the slight resiliency of the rolled over rim. Any increase in internal pressure also acts to decrease leakage due to the increase in the pressure of annulus 25 against torus 24.

In a preferred embodiment of the present device the container 12 is preferably an aluminum can into which the electrochemical elements are placed and a small punch press thereafter curls the can lip to form torus 24. The torus will have a ring shaped cross section of about 0.13 inch in diameter which gives the torus itself about a one inch inside diameter opening based upon the diameter of the can body which has an outside diameter of about 1.25 inches. The use of this size can and curl is extremely advantageous because it conforms to the aerosol industry standard and closely approximates the standard D cell diameter. This makes it possible to utilize ordinary aerosol industry filling and sealing technology to produce the cells of the invention. Such technology as used in the aerosol industry has been highly developed whereby the cells can be filled with a pressurized, normally gaseous electrolyte which is analogous to the Freons or other volatile propellants which are in common use in the aerosol industry.

A preferred filling method that has been adapted from the aerosol industry involves placing the open ended can, having torus 24 thereon and complete with electrochemical elements therein, under an evacuation-electrolyte fill head. The gas is evacuated from the can and replaced with a metered amount of electrolyte which in this instance is $SO_2$ that has been chilled to a temperature sufficient to maintain it as a non-volatile liquid. Normally a temperature in the range of $-17$ to $-35°$ C. will be adequate. While the boiling point of the electrolyte is approximately $-10°$ C. the use of a substantially lower temperature as set forth above is highly desirable so that the mass of chilled electrolyte will be adequate, when introduced into the can 12, to immediately chill the can and contents below the boiling point of the electrolyte and to maintain the entire article below that point for at least about 30 seconds during which time cap 26 can be placed on said container 12 and crimped into sealing relation in the manner indicated above. Thereafter, one or more layers 35, 37 (FIG. 2) of insulating plastic material can be placed around the cylindrical side wall of can body 12 to extend from the closure to the bottom of said can body. Advantageously such layers will be formed by heat shrinking one or more tubes of shrinkable plastic around said can body in a manner known in the art.

An alternate method which is useful for filling the electrical devices of this invention involves the evacuation of the can and the pressure filling of electrolyte at room temperature. In this embodiment of the invention the closure 14 is loosely placed on can body 10 having the electrochemical elements previously placed therein and having torus 24 previously formed thereon. The loosely covered can is placed under a filling head, the filling head seals the upper end of the can from the external environment, and a vacuum is drawn whereupon the air is removed from the container. Thereafter, electrolyte under pressure is filled into the can body through the space between the can and the loosely fitting closure. The closure thereafter is forced onto the upper edge of the can body and crimped into sealing relationship with the torus. Thereafter, one or more layers of insulating material may be placed around the side wall of the can body.

Member 26 is analogous to the valve mounting cup commonly used in the aersol industry but in view of the elimination of the valve means, member 26 is referred to as a blind mounting cup. Thus, in accordance with this invention, the highly developed technology of the aerosol industry has been adapted to the non-analogous field of batteries whereby it has been made possible to form batteries in an inexpensive manner utilizing existing equipment and known from the non-analogous aerosol field thereby eliminating the necessity of developing special machinery to achieve results which were apparently unobtainable in the battery field except by the provision of expensive technology and hermetic sealing methods and equipment.

Although the device shown in FIGS. 1 and 2 is an electrochemical cell, it should be realized that the housing could be adapted to enclose other electrical devices such as electrolytic capacitors. Preferably container 12 is a unitary structure although the container could be made from an assembly of more than one component. Suitable electrically conductive materials for the container include steel, aluminum, copper, silver, alloys thereof and the like, aluminum being preferred for some electrochemical cell applications.

In the same fashion, member 26 may be a unitary structure or a composite of different structures. Suitable electrically conductive materials for the member also include steel, aluminum, copper, silver, alloys thereof and the like, steel is preferred for $Li/SO_2$ electrochemical cell applications. For certain applications, it may be desirable for the member to contain both electrically conductive portions and electrically insulative portions. By selecting appropriate materials for the container 12 and members 22 and 26, the device 10 can be made substantially non-magnetic and thereby useful in systems for detecting magnetic items.

In the embodiment shown in FIGS. 1 and 2, electrically insulating material 28 is disposed between edge portion 32 of the closure member 26 and the rolled rim 24 of the container 12 to electrically isolate these portions of the device 10. Such insulating material 28 is necessary when the member 26 is entirely electrically conductive. However, if member 26 is a composite of electrically conductive portions and electrically insulating portions, insulating material, 28 disposed between the member 26 and the rolled rim 24 may not be necessary.

In those preferred embodiments where electrically insulating material 28 is used, it may take several different forms. A preformed gasket or grommet of a suitable inert polymeric material such as is disclosed in application Ser. No. filed on even date herewith, which is a polyhalogenated hydrocarbon resin may be utilized. Alternatively, a prepolymer or polymer resin material may be applied to either the edge portion 32 of member 26 or to the rolled rim 24 of container 12 or to both and then flowed and/or cured by methods such as the application of heat after closure of the device 10. Suitable insulating, polymeric, inert materials for a preformed gasket or for applied resin material include polytetrafluoroethylene, neoprene, polyurethane, polypropylene, polyethylene, and the like. Heat shrinkable resin sleeves may also be applied to the rim 24 of container 12 prior to or after rolling of the rim.

Materials that will adhere to the rolled over rim 24 and the member 26 are preferred for use as element 28. Suitable materials of this type include polymeric, polyhalogenated hydrocarbon materials such as: FEP copolymers which are copolymers of fluorinated ethylene and propylene; $PVF_2$ which is a homopolymer of vinylidene fluoride; ETFE copolymers which are copolymers of ethylene and tetrafluoroethylene; CTFE polymers which are chlorotrifluoroethylene resins and E-CTFE copolymers which are copolymers of poly (ethylene-chlorotrifluoroethylene); and polymers having a fluorocarbon backbone and perfluoro alkoxy (PFA) side chains wherein the alkoxy radical contains from 1-6 carbon atoms.

While the present invention is particularly useful for electrochemical cells in which the anode 18 is preferably lithium metal, other active metals above hydrogen in the activity scale or electromotive series including sodium, potassium, rubidium, calcium, magnesium, strontium, barium and cesium may be used either singly or in combination. Similarly the cathode current collector 20 on which the solvent or co-solvents are electrochemically reduced will advantageously be a screen, having applied thereto a mixture of an inert and electrically conductive material such as carbon black, graphite, or other electrical conductors of high surface area, and, preferably, including absorbing and binding agents. Normally gaseous electrolytes for which the cells of the present invention are particularly useful include such materials as sulfur dioxide ($SO_2$), nitryl chloride ($NO_2Cl$), nitrosyl chloride (NOCl), and nitrogen dioxide ($NO_2$).

While the present invention has been described with reference to particular embodiments thereof, it will be understood that the structure and method defined herein will be useful for the formation of other electrical devices such as, for example, electrochemical cells having other fluid electrolytes. In addition, numerous other modifications may be made by those skilled in the art without actually departing from the spirit and scope of the invention as defined in the appended claims.

I claim:

1. A method for forming a pressurized electrical device comprising the steps of loosely placing a closure on a can body having electrical elements therein and having a torus formed thereon by inwardly rolling the rim of the upper end of the can, sealing the area surrounding the upper end of the can and closure from the external environment, removing the air from the container and from the area surrounding the upper end of the can and closure, filling electrolyte under pressure into the can body through the space between the can and the loosely fitting closure, and thereafter forcing the closure onto the upper edge of the can body and crimping it into sealing relationship with the torus.

2. A method of forming a pressurized electrochemical cell comprising the steps of: curling the rim of the open upper end of a cylindrical metallic can body to form a torus the innermost portion of which has a diameter less than the diameter of said can body; positioning an anode and a cathode within said can body, electrically connecting one of said anode or cathode to said can body and the other to a cover for said can body, evacuating the gas from said can body, cooling a normally gaseous electrolyte to a temperature below its liquefaction point and introducing the thereby liquefied electrolyte into said can body, immediately closing said can body with said cover and crimping said cover against said torus to close said electrochemical cell.

3. The method as in claim 2 wherein an insulating polymeric material is placed between said can body and said cover to dielectrically separate said cover and said can body.

4. The method of claim 2 wherein said electrolyte is cooled to a temperature sufficiently below its liquefaction point to enable the mass of electrolyte to cool the can body and its contents below said point.

5. The method of claim 4 wherein said temperature is below $-17°$ C.

6. The method as in claim 5 wherein said electrolyte is sulfur dioxide ($SO_2$).

7. The method as in claim 6 wherein said anode is lithium.

8. The method of claim 2 wherein said cover is placed on said can within about 30 seconds after said electrolyte is added.

* * * * *

UNITED STATES PATENT AND TRADEMARK OFFICE
CERTIFICATE OF CORRECTION

PATENT NO. : 4,136,438
DATED : January 30, 1979
INVENTOR(S) : Henry Rogers Mallory It is certified that error appears in the above-identified patent and that said Letters Patent are hereby corrected as shown below:

Change the title from "Electrical Device" to --- Method of Making an Electrochemical Cell ---, Column 2, line 35, after "body" delete "16".

Column 2, line 67, delete "now" and substitute --- not ---,

Column 4, line 43, delete "known" and substitute --- know-how ---,

Column 5, line 18, after the words "Serial No." delete: "filed on even date herewith" and substitute: --- 728,673 filed on October 1, 1976, now Patent No. 4,110,518, and ---

Signed and Sealed this

Eighteenth Day of September 1979

[SEAL]

Attest:

LUTRELLE F. PARKER
*Attesting Officer*    *Acting Commissioner of Patents and Trademarks*